United States Patent [19]

Vidalin

[11] 4,443,860

[45] Apr. 17, 1984

[54] SYSTEM FOR HI-SPEED COMPARISONS BETWEEN VARIABLE FORMAT INPUT DATA AND STORED TABULAR REFERENCE DATA

[76] Inventor: Jacques Vidalin, 12 rue du Palais des Guilhem, Montpellier, France, 34000

[21] Appl. No.: 158,318

[22] Filed: Jun. 10, 1980

[30] Foreign Application Priority Data

Jun. 19, 1979 [FR] France .................. 79 15701

[51] Int. Cl.³ .................. G06F 7/06; G06F 7/22; G06F 13/00
[52] U.S. Cl. ..................... 364/900; 365/49; 340/146.2
[58] Field of Search ... 364/200 MS File, 900 MS File; 365/49; 340/162.5

[56] References Cited

U.S. PATENT DOCUMENTS

| | | | |
|---|---|---|---|
| 3,585,605 | 6/1971 | Gardner et al. | 364/200 |
| 3,729,712 | 4/1973 | Glassman | 364/900 |
| 4,044,336 | 8/1977 | Babb | 364/900 |
| 4,053,871 | 10/1977 | Vidalin et al. | 340/146.2 |
| 4,064,553 | 12/1977 | Kashio | 364/200 |
| 4,145,753 | 5/1979 | Kashio | 364/900 |
| 4,152,762 | 5/1979 | Bird et al. | 364/200 |
| 4,153,943 | 5/1979 | Anderson | 364/900 |
| 4,290,115 | 9/1981 | Pitt et al. | 364/900 |
| 4,366,551 | 12/1982 | Holtz | 364/900 |

FOREIGN PATENT DOCUMENTS 2289962 5/1976 France .

OTHER PUBLICATIONS

Leilich, Stiege, & Zeidler, *A Search for Data Base Management Systems*, Fourth Intl. Conf. on Very Large Data Base, Berlin, Sep. 13-15, 1978

*Primary Examiner*—James D. Thomas
*Assistant Examiner*—Archie E. Williams
*Attorney, Agent, or Firm*—Ostrolenk, Faber, Gerb & Soffen

[57] ABSTRACT

Data comparisons are carried out between reference logical entities and logical entities proceeding from a file. The reference logical entities of different types are stored vertically in different horizontal zones (A, B, C) of a table in the order in which the entities of the same type are found in the file. In a control memory are recorded, line by line, items of control information relative to the comparison to be made with the reference entities of the zone of said table which corresponds to the line, items of storage control information and items of information for control of operations to be carried out at the end of comparison and/or storage, in particular the linkage of the processes to be carried out. The memory is read line by line while the logical entities from the file are received for comparison.

6 Claims, 11 Drawing Figures

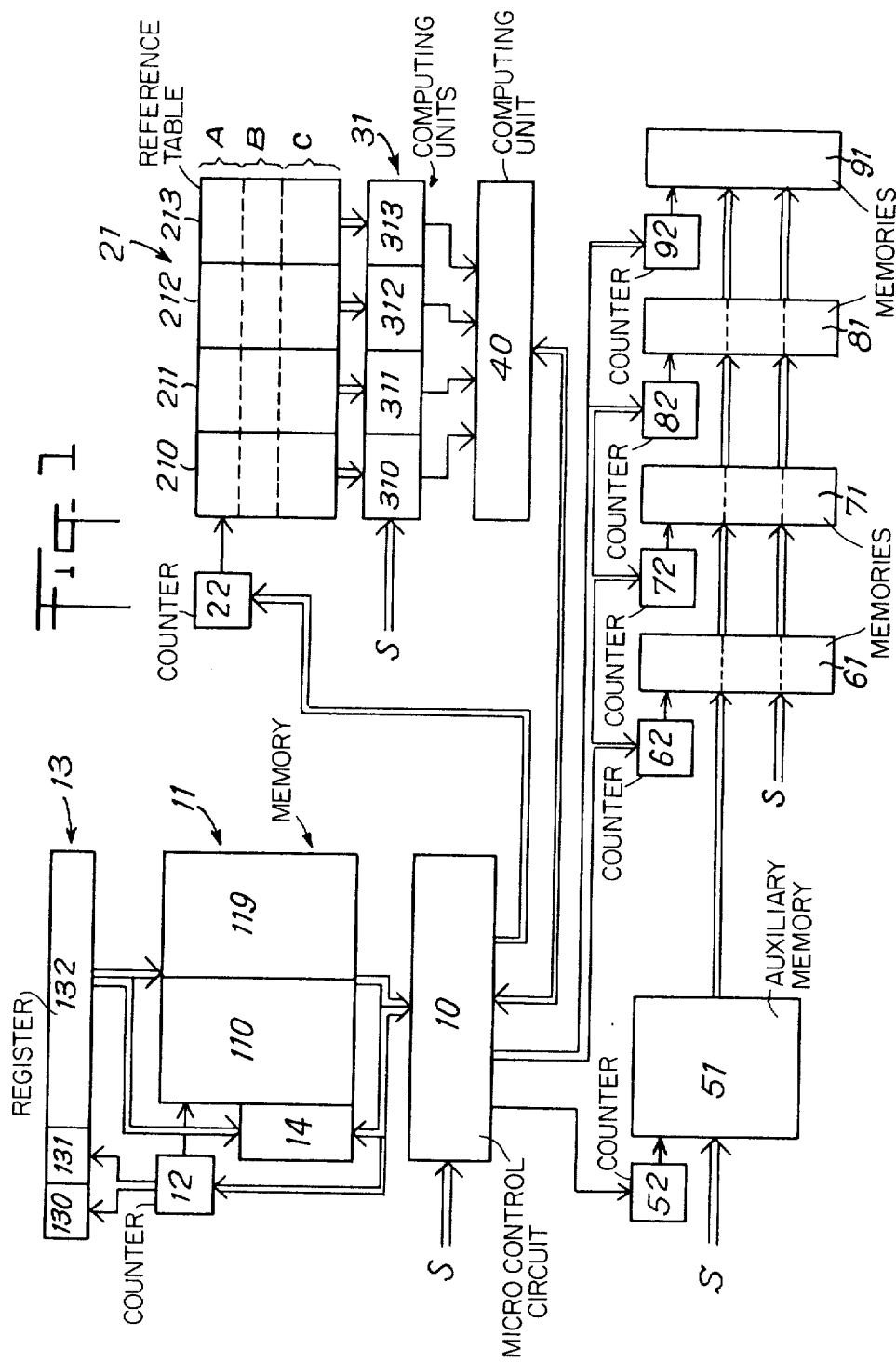

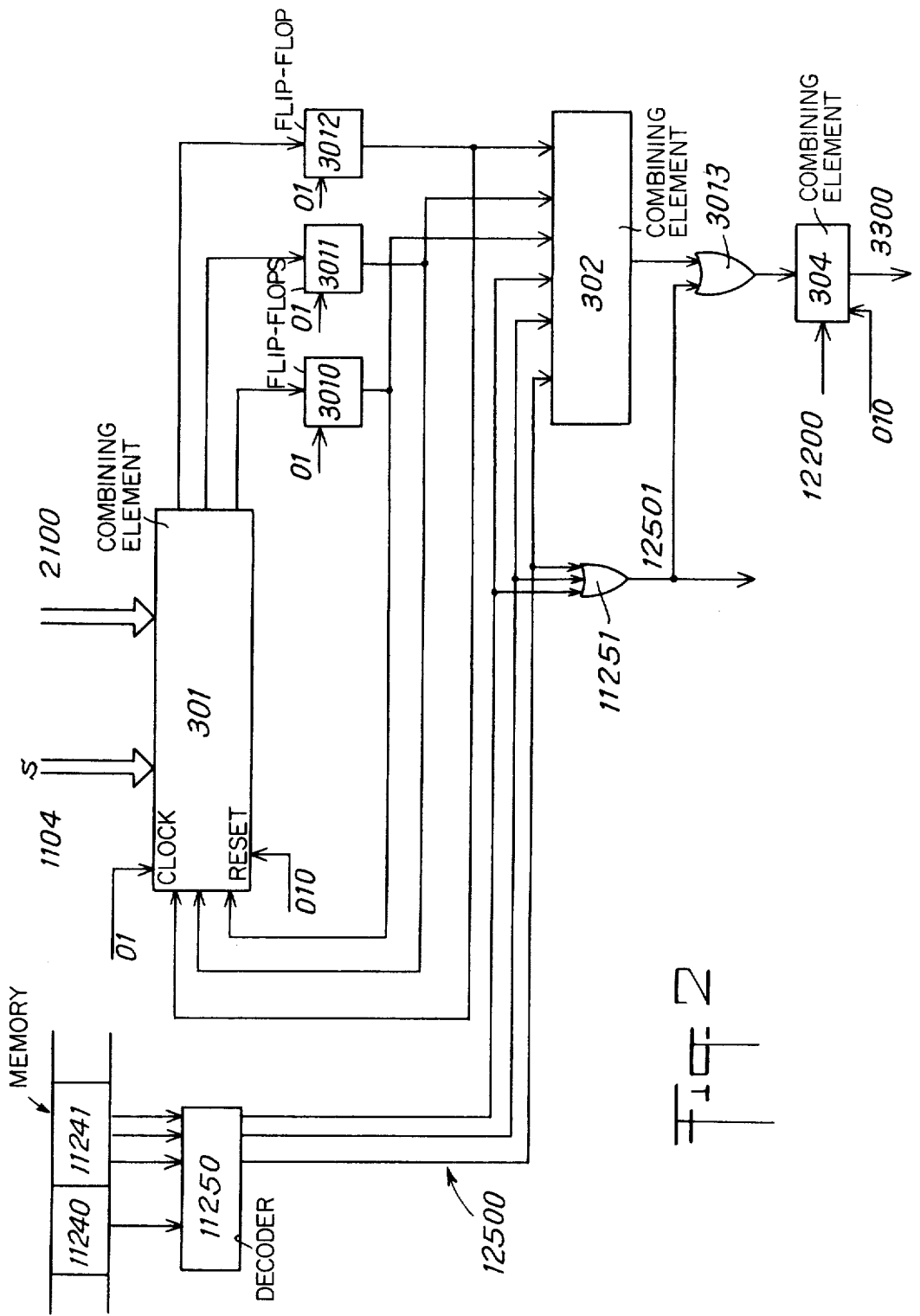

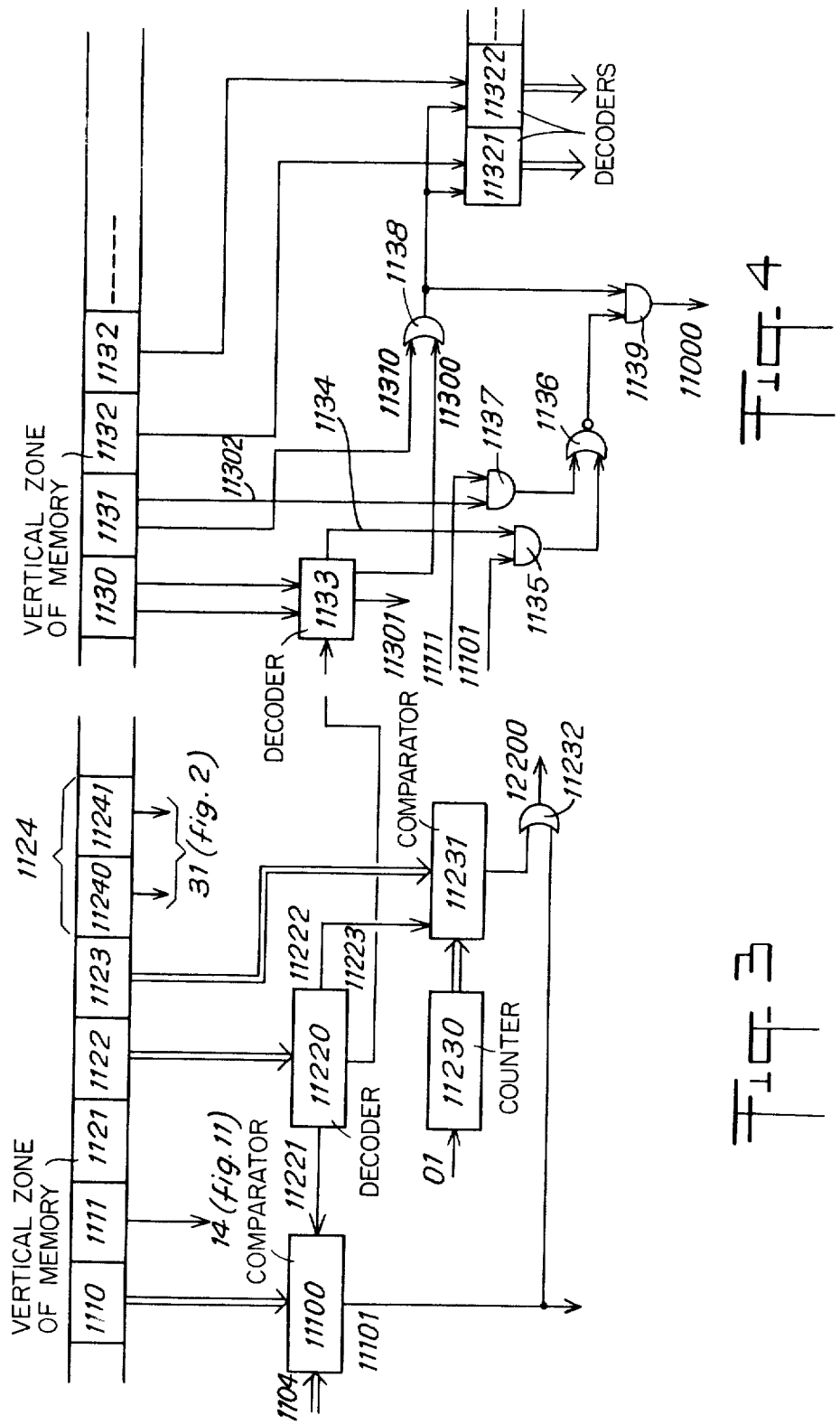

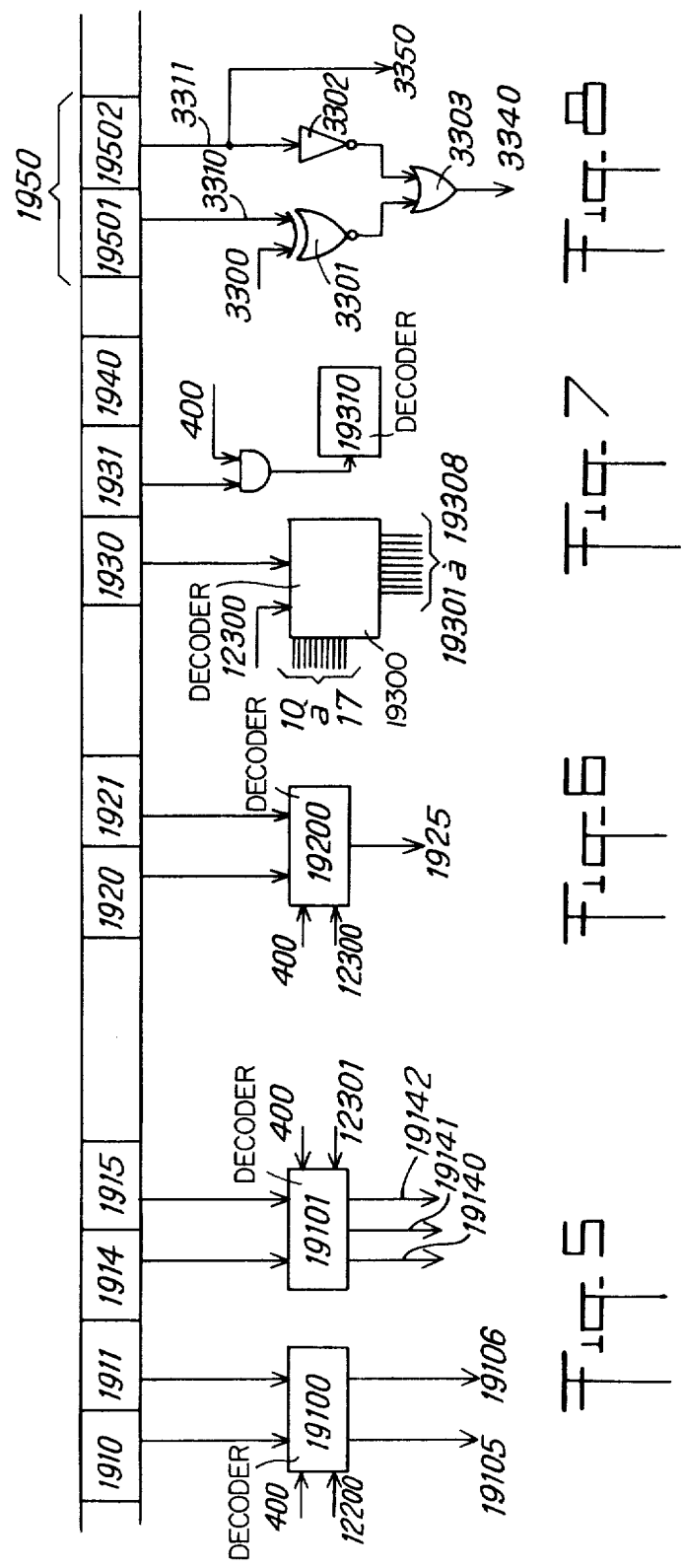

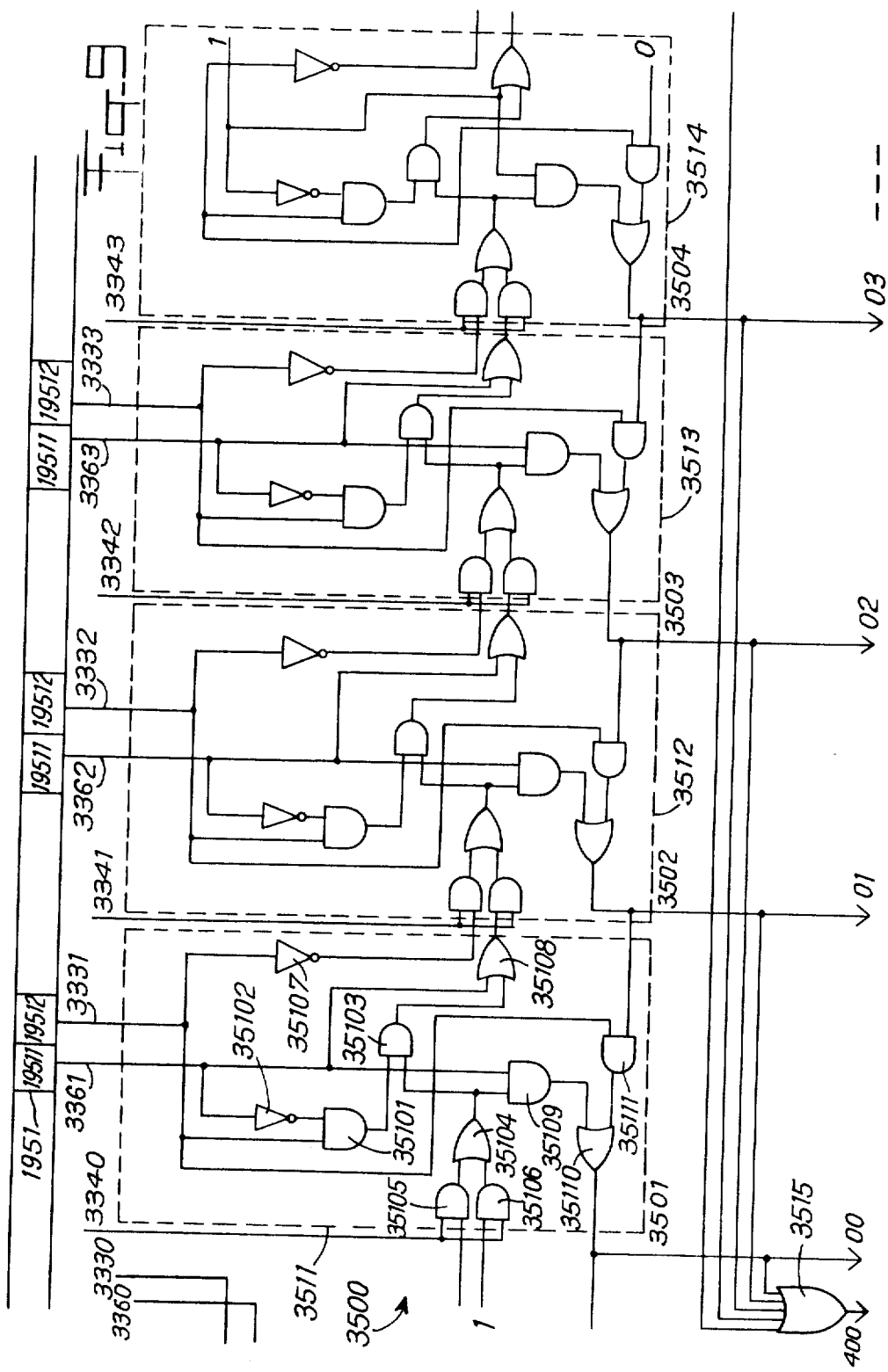

SYSTEM FOR HI-SPEED COMPARISONS BETWEEN VARIABLE FORMAT INPUT DATA AND STORED TABULAR REFERENCE DATA

BACKGROUND OF THE INVENTION

The present invention is directed towards a method for controlling comparisons to be carried out between reference data elements and input data elements proceeding from a source file.

More precisely the present invention is directed towards a method and apparatus of the type according to which reference data elements of the same type are drawn up in respective columns of a reference table and compared in parallel to input data elements proceeding from a file. A method of this type is disclosed in U.S. Pat. No. 4,053,871, the disclosure of which is incorporated herein by reference. In this method, each input data element proceeding from a file (e.g. a name) comprises one or more individual items of information (e.g. the letters of the name) which are received sequentially and are compared in parallel and in succession with the individual items of information (e.g. letters) of the same rank of the reference data elements (e.g. names) contained in the successive lines of the table. The successive results of these matchings are combined in order to provide the result of the comparison and to decide upon the information which is to be stored.

Processing of the input data from a file necessitates marking of the data. When the latter has a complicated construction, marking by means external to the file is difficult and laborious, especially if the file is of large capacity and is subject to frequent updatings.

External marks may be dispensed with by introducing into the file localization elements such as special data elements or labels and special characters or separators such as described in U.S. Pat. No. 4,053,871. Different comparison sub-assemblies may be employed for marking the separators, labels and data with a view to localizing in the file the items of information which are to be recognized and if necessary to be stored.

However, when the construction of the information contained in the file is complicated one must have recourse to a high number of labels and separators, which complicates the system of processing of the file.

In addition to the foregoing, the present invention has the aim of providing a method of microcontrol which enables the method of comparison described above to be applied to items of information being received from a file having any construction (i.e., of any format) while working at the frequency at which the items of information delivered by the file, without external marking and while controlling the simultaneous execution of the elementary functions connected with both the comparison and with the storage operations to be carried out, without interruption of the evolution of the file. These elementary functions (which are to be executed simultaneously) relate to the localization, to the processing and to the transfer of the items of information proceeding from the file, to the sequential linkages of the groups of simultaneous operations and to the tests concerning the results obtained from the preceding comparisons. The items of information subjected to the method of comparison may be of fixed or variable length, the method of control then enabling in particular, a reduction in the number of labels and separators necessary to the localization of the data which are to be worked. The processes which are to be executed may, depending upon the method of control, allow of any of the forms of looping which the processing of a construction of items of information may call for.

SUMMARY OF THE INVENTION

In accordance with the method of the present invention:

(a) Reference data elements are recorded in a reference table with data elements of different types being stored vertically in different horizontal zones of the table. The reference data elements are stored in the same order that the sequences of data elements which they are to be compared appear, not necessarily in a consecutive fashion, in the source file. Each horizontal zone of the table contains reference data elements of the same type drawn up in their turn vertically by columns. For example, a given zone will contain the five words of the sentence "I want to go home", each word (reference data element) being located in a respective line of its column. All of the words in this zone are related and such that the reference data elements will be considered of the same type. These elements will be compared to input data elements also of the same type.

(b) In a control memory, the following is recorded line by line:

(1) First items of control information including, firstly, items of control information relating to the comparison to be carried out between input data elements of the same type from the source file and reference data elements located in a horizontal zone of the table corresponding with the line in the control memory in which the said items of comparison control information are recorded, and secondly items of control information relating to the storage of input data elements proceeding from the source file, and (2) second items of information for control of operations to be carried out at the end of the comparison or comparisons effected with one or more items of input data elements from the file and/or from the storage of one or more items of input data elements from the file, the said items of information for control of operations including items of jump control information for controlling the linkage of the processes to be carried out;

(c) items of information from the source file are consecutively received; and (d) the operations are executed which correspond with the first items of control information from a first line in the control memory, then the operations which correspond with the second items of control information from this line, among them especially the linkage onto another, not necessarily consecutive, line in the control memory and if necessary onto a horizontal zone of the reference table corresponding with this other line.

It is advisable to observe here that the terms "items of control information relating to a comparison", "items of storage information" and "items of information for control of operation" refer to both the presence of instructions for carrying out a comparison, a storage or an operation, and the absence of such instructions.

The linkage between the lines of the control memory which correspond to different horizontal zones of the reference table enable linkages to be effected between reference data elements of different types. The result is great flexibility of processing of the source file and the possibility of reducing the number of labels and of special characters specific to this file.

Another advantage of the method in accordance with the present invention lies in the fact that it may be used upon files having any construction, that is to say, files which contain items of information of fixed or variable format, in characters of immaterial nature, which do not have to be modified in order to contain instructions.

The items of control information recorded in the control memory may include items of address control information for marking a point of origin in the source file from which operations of comparison and/or storage are carried out. One may have recourse to address control information prior to processing of a portion of the source file or during the course of processing for skipping over a zone of the source file which contains items of information upon which no processing is to be carried out.

The operation of address control may be effected in several ways.

In at least one line of the control memory special characters are recorded. Such characters are also employed as marks in the source file.

As marks one may employ, for example, besides special characters marking the end of input data elements of variable length, special characters which mark the end of items or sub-items of the source file.

One may also record in at least one line of the control memory items of control information relating to the number of loops to be carried out for the processes corresponding with this line of the control memory and in a store are registered firstly items of information relating to the number of loops to be carried out for the said processes and secondly items of information relating to the jump to be carried out in the control memory and if necessary in the reference table when the said number of loops has been completed. As the input data elements are received from the source file, the number of which correspond to the said line of the control memory processes and which have been completed is counted, and the operations are executed which correspond with the said information relating to the jump when the number of processes completed is equal to the number of loops recorded.

As indicated above, the method in accordance with the invention may be used whether the input data elements from the source file have a totally fixed format, a partially fixed format, or no fixed format.

In at least one line of the control memory there are recorded items of information relating to the construction of the input data elements upon which must be carried out the comparison and/or the storage controlled by items of control information from this line of the control memory must be carried out. As the input data elements are received from the file one employs the items of information (in the line of the control memory) on the construction of the input data elements for recognizing the end of each of the received data elements and consequently controlling the initialization or the end of an operation of comparison and/or of storage. For input data elements of fixed format, the individual items of information proceeding from the source file are counted in order to recognize the end of each input data elements.

Among the control operations which may be recorded in one line of the control memory, one may distinguish between those which refer to the operations of an iterative character and the operations to be carried out at the end of processing.

The items of control information of an iterative character comprise items of control information relating to a comparison. The latter characterize the functions of iterative comparison of the items of information of the same rank of the input data elements proceeding from the source file and of the reference data elements, and the functions of combination of the results of the different comparisons. By way of indication the functions of comparison may be: "equal to", "greater than", "less than" or their opposites: "different from", "less than or equal to", "greater than or equal to". The functions of combinations are Boolean combinations of the reslts of the comparisons dealing with results obtained sequentially between sequences of data elements and simultaneously between data elements of the same type, hence belonging to one and the same sequence.

The items of control information of an iterative character comprise also the items of control information relating to storage, which consist in general in the presence or absence of instructions for storage of items of information proceeding from the source file.

The second items of control information may be for unconditional operations which are necessarily carried out, or conditional operations which are carried out only if a particular condition is fulfilled, for example, a positive or negative result at the end of the comparisons carried out for a group of data elements corresponding with one item of the file.

These conditional or unconditional operations may be connected with storage operations resulting from the transfer of items of information from the source file towards a peripheral unit, an auxiliary memory, an output or any other member for storage of items of information. They correspond therefore with the erasure or the preservation of stored items of information.

Among the second items of control information are found items of jump control information for carrying out linkages in the control memory as well as in the reference table, a linkage of one line to another in the control memory not necessarily corresponding with a linkage of one horizontal zone to another in the reference table.

The items of jump control information may result from the combination of a number of items of control information. It is so especially when a conditional operation is controlled by a specific item of information which in turn results from other items of information. These other items of information may, for example, for an overall result relate to the Boolean combination being sought between the different elementary results obtained, either simultaneously or consecutively. Similarly it may be arranged that a jump control operation in the control memory can control a jump in the reference table but that any incrementation of the table of the reference logical entities is prohibited for a zero operation code (NOP) corresponding with the new line of the control memory, that is to say, in default of comparison to be carried out upon the data elements of the horizontal zone of the reference table corresponding with the line of control memory for which the jump has been ordered.

Other second items of information for control of operations may be recorded in the control memory. One may mention the operations of linkage between peripheral units or auxiliary memories and in particular at the end of processes the operations of tests and of comparisons with the reference results.

The present invention also refers to a device for putting into effect the method in accordance with the invention, the device being of the type which includes a reference table for storing reference data elements vertically and horizontally, computing units each having one input which receives the items of information of the input data elements from the file and another input which can receive the items of information contained in a column of the table, at least one buffer memory which can receive items of information proceeding from the file, and a unit for control of the processing to be carried out upon the items of information from the file.

In accordance with the invention this device is characterized in that:

(A) The table is divided into a number of different horizontal zones, reference data elements of the same type being stored vertically in each zone in the order in which input data elements to which they are to be compared appear, not necessarily in a consecutive fashion, in the source file. Each reference data element located in a given horizontal zone of the table is located in a respective column of that zone.

(B) The control unit includes a control memory for storing, line by line first and second items of control information elements. Each first item of control information includes both items of control information relating to the comparison to be carried out between input data elements of the same type from the source file and reference data elements located in a horizontal zone of the table corresponding with the line in the memory in which the said items of comparison control information are recorded, and items of control information relating to the storage of input data elements proceeding from the source file. The second items of control information are for control of operations to be carried out at the end of the comparison or comparisons effected with one or more input data elements from the source file and/or from the storage of one or more logical entities from the source file. The microcontrol circuit is connected to the control memory for delivering control signals corresponding with the first and second items of control information.

The control memory as well as the reference table may be realized in the form of addressable memories or push-down memories.

Other features and advantages of the method and of the apparatus for the control of comparison in accordance with the invention will appear from the reading of the description given below by way of indication but non-restrictively, by reference to the Figures of the drawings attached which illustrate:

BRIEF DESCRIPTION OF THE DRAWINGS

FIG. 1 is a very general diagram of a control device in accordance with the present invention;

FIG. 2 is a more detailed diagram of a computing unit for comparison from the device illustrated in FIG. 1;

FIGS. 3 to 7 are more detailed diagrams of portions of the control unit of the device represented in FIG. 1;

FIGS. 8 to 10 are more detailed diagrams of computing units used with the device illustrated in FIG. 1.

DETAILED DESCRIPTION OF THE PREFERRED EMBODIMENT

Figure 10:
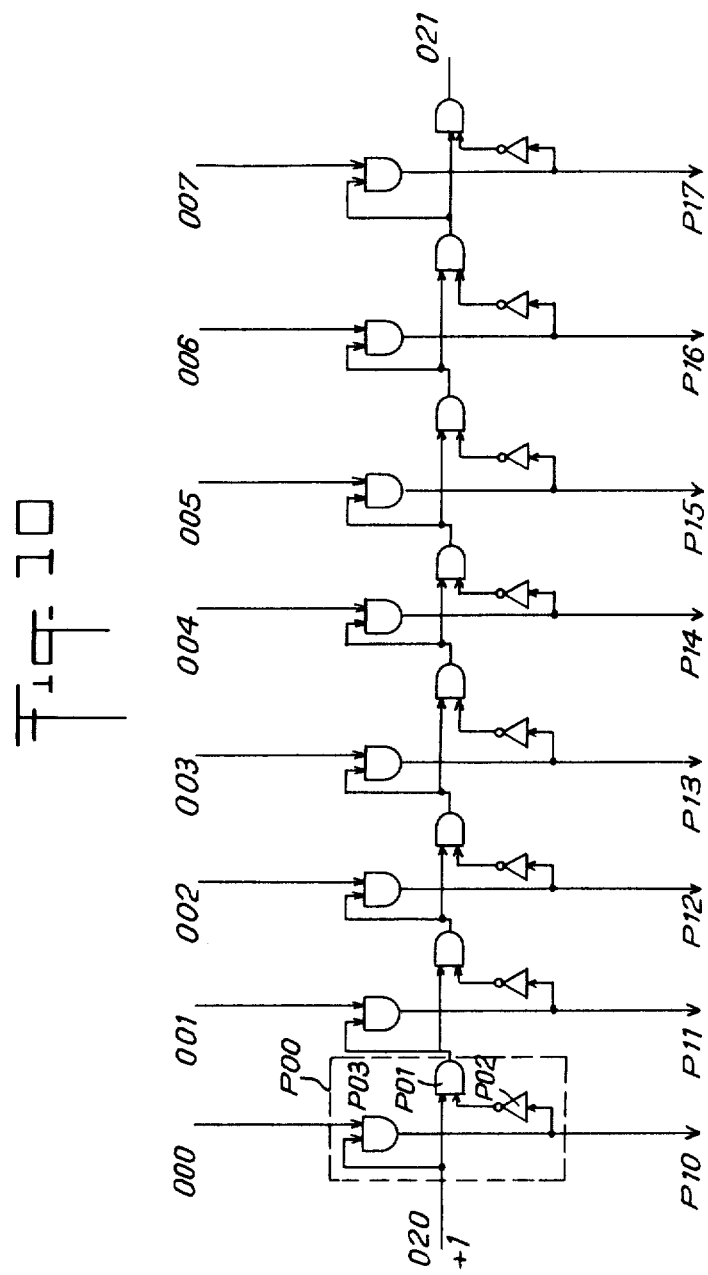

In FIG. 1 is shown the diagram of a particular embodiment of a control device in accordance with the invention.

This device includes an array or reference table 21 consisting in this example of an addressable memory. For clarity explanation, the table 21 is described and illustrated as being divided into a number of columns 210, 211, 212, 213 and a number of horizontal zones A, B, C which are variable and not necessarily of equal length, i.e. may or may not have the same number of lines in a zone. In fact on the strictly material plane the organization of the memory may be different to the extent that the same dividing-up is found again between a plurality of storage elements (memories) which can be initialized by means of one and the same counter 22. Furthermore the columns and the horizontal zones may be of any number.

A group 31 of computing units 310, 311, 312, 313 are each associated with a different columns of the table 21 and are connected to the computing unit 40 for combination of the results of the comparisons. These computing units 31 receive the items of information which proceed from a source file S and upon which must be carried out one or a number of comparisons. One or more items of information define a single input data element.

This comparison (or these comparisons) are effected under the control of a control unit comprising a control memory 11, a microcontrol circuit 10 which receives both the items of information from the file and instructions from the memory 11, an addressable counter 12 which manages access to the memory 11, a register 13 for loading the memory 11 and a device 14 for localization of the information by counting the input data elements received from the files and by counting or identification of the separators.

The loading register 13 comprises first zones 130, 131, connected to the counter 12 and comprising indications relating to the addresses to which the items of information or the instructions contained in a second zone 132 must be loaded into the memory 11 or the localization device 14.

The memory 11 is divided into horizontal lines, each horizontal zone of the table 21 corresponding with one horizontal line of the memory 11. As indicated above in relation to the table 21, the dividing up of the memory 11 is defined here as being realized in horizontal lines only for the clarity of the explanation.

The memory 11 is divided up in addition into vertical zones 110, 119 in which respectively store instructions corresponding to operations of an iterative character carried out during the processing of each line of the memory 11, and instructions corresponding to terminal operations carried out at the end of processing. These different zones of the memory will be defined in greater detail later.

An auxiliary addressable memory 51 and its associated addressable counter 52 are provided for storing, conditionally or unconditionally, the information proceeding from the files as a function of control signals provided by the circuit 10.

Finally, addressable counters 62, 72, 82, 92 . . . enable the transfer of items of information proceeding from the files onto peripheral units, outputs, or any other memory 61, 71, 81, 91 as a function of commands provided by the circuit 10.

Before describing in detail the operation of the control device, it is helpful to provide a description of the process of iterative and simultaneous comparison, as described in U.S. Pat. No. 4,053,871.

A files upon which a comparison is to be carried out includes input data elements (identified in said patent as logical entities) consisting of one or more items of information, for example, of octets. The logical entities may be fixed or variable in length. When the logical entities are variable in length, it is necessary to add to each logical entity a special character indicating the end of it. The logical entities are gathered in sequences, identified each by a particular label (or ticket, or title, etc.) called a special logical entity. The sequences may be of fixed or variable length, that is to say, they may include a number of logical entities which is fixed or which is variable. In the second case, a special character is added to each sequence indicating the end of it.

An iterative and simultaneous comparison is a simultaneous comparison between each logical entity, special or not, proceeding from the files and a number of reference logical entities located in table 21. The comparison is done to determine a relationship between the logical entity from the files and the reference logical entities. The relationship is, for example, a relationship of equality, of inequality, or bracketing, etc.

For this purpose each logical entity proceeding from the files is matched, item of information by item of information, with each of the reference logical entities. The results from the matchings are combined in order to provide the total result of the comparison. See the discussion at columns 1-7 of U.S. Pat. No. 4,053,871.

With the device in accordance with the present invention, one loads into the table 21 (into one and the same column) a sequence of reference data elements of different types appearing in the same order, but not necessarily consecutively, in the files. In one and the same horizontal zone of the table 21, one stores vertically the reference data elements of the same type upon which a comparison is to be carried out simultaneously and in parallel, the length of each horizontal zone corresponding either to the maximum length of the reference data elements or to the longest of the reference data elements appearing in this zone. Reference to data elements of the same type refers to data elements belonging to a group or sub-group of the same meaning i.e., words in a sentence.

Data elements of different types refers, for example, to the labels on the one hand and the data on the other. The labels may be of different levels, a label which identifies a sequence from the files which contains a number of sub-items identified each by a label of lower level. The labels of different heirarchy levels are considered as data elements of different types.

Particular embodiments will now be described in detail, of different portions of the method and of the device in accordance with the invention, namely, in succession: the loading into the control store memory 11 and the localization device 14 of the instructions necessary to effectuate the localizations, comparisons and transfers to be carried out upon the items of information received from a files; the construction and operation of a computing unit for comparisons; the control of the operations of the first level to be carried out at the end of each data elements; the control of operations of the second level to be carried out at the end of each sub-item; the control of transfers; the control of the linkages on the control table; the control of the linkages on the reference table; the control of the linkages to be carried out on a peripheral unit; the controls and the circuits relating to the matchings with the reference results; and the controls relating to the tests. Various examples of using the invention will then be described.

LOADING OF THE INSTRUCTIONS

The instructions necessary to effect the comparison as well as the transfers to be carried out upon the items of information proceeding from the files are loaded into the control memory 11.

Each line of the control memory 11 corresponds to an instruction for (1) localization of the items of information to be processed; and/or (2) comparisons to be carried out between the input data elements received from the source files and the reference data element or elements (in table 21); and/or (3) storage of the items of information received from the files. When the localization results from a comparison which is to be carried out, for example, upon a special reference or label logical entity, the instruction for localization is an instruction for comparison.

Each line of the control memory 11 corresponding with a horizontal zone of the reference table is loaded as follows.

Into the vertical zone 110 (FIGS. 3, 4) are introduced at 1110 and 1111, if necessary, codes relating to the separators of the different levels (input data elements, sub-items, sequences, etc.), the device allowing for each line of the control memory 11 the loading of the separators corresponding to at least two levels of processing. The loading of the first level separator code is necessary when the input data elements upon which the comparison is to be carried out have a variable length.

Codes representative of the nature of the input data elements (information declared to be binary or hexadecimal or alphanumerical, etc.), the nature of the format of the input data elements (fixed or variable format) and the length of the format when it is fixed are recorded respectively in 1121, 1122 and 1123.

The code of the operation which is to be carried out upon each item of information of the input data elements which are to be compared is loaded into 1124. It will be observed that a number of divisions 1124 are provided so as to enable, if necessary, the loading of different codes of operation according to the columns of the reference table 21. The code of the operation to be carried out includes an item of information which characterizes the nature of the operation (logical, arithmetical, ...) (11240) and an item which characterizes the nature of the logical operation ($=, \neq, <, \leq, >, \geq$) or of the arithmetical operation ($+, \times, -, ", \ldots$) or of any other operation (11241).

Codes controlling the conditional or unconditional transfer of the items of information proceeding from the files are introduced into 1130 and 1131. These codes correspond for 1130 with the items of first level information of the device (logical entity of fixed or variable length) and for 1131 with the items of second level information (second level separator). The separator which marks the end of a input data element of variable length is transmitted necessarily with the input data element which corresponds with it. In the absence of a input data element of variable length which has to be transferred, the code introduced into 1130 controls the transfer of the corresponding separator. When the items of information of a sequence proceeding from the files are not being subjected to comparison, the transfer of the sequence is controlled as if it were a input data element.

Codes controlling the destination of the items of information which are proceeding from the files and the transfer of which is controlled by the codes introduced into 1130 and 1131, are introduced into 1132. It will be observed that a number of divisions 1132 are provided, in general at the rate of one division per computing unit for comparison so as to enable if necessary for the items of information received from the files source, simultaneous storage in a number of storage devices (peripheral units, outputs, or any other store). The code 1132 may include as many subassemblies as necessary for controlling the storage by incrementation of the storage memory or by jumping to a new predetermined address.

Into the vertical zone 119 of the control memory 11 (FIGS. 5 to 9) are introduced the codes of the operations which are to be carried out at the end of processing upon a input data element or a sequence of input data elements from the files or at the end of an operation of localization.

These operations comprise linkages to be carried out in the reference table. One considers first of all the linkages of the first level. These have to be carried out after each input data element proceeding from the files has been received, that is to say, after recognition of the separator of the first level, in the case of a input data element of variable length or, in the case of a input data element of fixed length, when the last item of information belonging to this input data element (and corresponding with this declared length) has been identified by counting. For these linkages of the first level one may introduce into the zone 119 the codes relating respectively to: the instruction for jumping of reference data elements or for restart of the same reference data elements or for absence of linkage to the conditional or unconditional character of the jump thus controlled. Similar codes are then introduced for the linkages to be carried out after each sub-item or sequence from the files, that is to say, corresponding with the second level of the device as chosen in this example.

However, in the example illustrated the controls for linkage onto table 21 of reference data elements are controlled by the codes controlling the linkages of the control memory 11, any incrementation of the table 21 being prevented for a matching operation code NOP relating to the comparisons to be carried out for the line of the control memory 11 for which the jump has been ordered.

The operations to be carried out at the end of localization or of comparison also include the linkages to be carried out in the control memory (FIG. 5). For the linkages to be carried out at the first level of the device as described above, one introduces into 1910 and 1911 the codes relating respectively to the instruction for jumping in the control memory 11 or for restart in the control memory 11 or for return into the auxiliary memory 51, and to the conditonal or unconditional character of the said linkage. Similar codes are introduced into 1914 and 1915 for the linkages to be carried out after each sub-item or sequence of the memory, that is to say, corresponding with the second level of the device chosen.

In 1920 and 1921 (FIG. 6) are recorded the codes relating respectively to the linkages to be carried out onto the peripheral unit being read, that is, for 1920 the indication that the reading of the periphery unit is interrupted with or without interruption of the running of the periphery unit for restart at the same positioning of the peripheral unit; for 1921 conditionally or not.

The codes for operations relating to the tests (FIG. 7) are also recorded: logical or arithmetical tests upon the results for the preservation of the stored items of information (1930) and counting of the TRUE results (1931).

Finally the codes of operations relating to the reference results are stored at the end of the line of the control memory 11. In 1940 are recorded the codes relating to the control of the transfer of the results towards the auxiliary memory 51. In 1950 (FIG. 8) in two sub-assemblies 19501 and 19502 are recorded the codes relating to the reference result 1 or 0 at therate of only one result per computing unit, and those relating to the character SPACE taken as a mask of the result and rendering TRUE this result whatever may be the comparisons carried out. In 1951 (FIG. 9), in two sub-assemblies 19511 and 19512, are recorded the codes relating to the OR or AND computing unit for linear combination of the results, as well as to the character SPACE taken as a mask for the said computing unit for combination, that is to say, establishing an independence between two linear combinations of the result. It will be observed that a number of divisions are provided so as to obtain an elementary result per computing unit for comparison and to combine together the said elementary results.

A localization may be carried out at the start or during the course of processing. One line of the control memory 11 may then correspond with this localization instruction. This localization may be effected as has been said, by a comparison carried out between a data elements, for example, a special data elements or label and the reference logical entity serving to localize the items of information proceeding from the source files. This localization separator belonging to the source files. It may also be effected by counting. This counting may be carried out upon octets, whatever may be the meaning of the octets received. The localization by counting of some such items of information or octets is effected as if it were for a input data element of fixed format by a declaration corresponding with a length of input data element or a given length. The localization may on the contrary result from a counting carried out upon octets which have a particular meaning by reason of their contents, for example, of the separators, or by reason of their localization in the stream of items of information, or upon input data elements of fixed format, in particular, of the labels. The nature of the elements counted may be defined implicitly as resulting from the declarations relating to the separators and to the data corresponding with the same control line.

These countings are executed by the localization device 14 which enables the corresponding linkages to be controlled. The counting may be a simple counting; or it may be combined with other countings, the combination of which enables an item of information to be localized during the course of a processing responding to a looping process. When the countings have to be executed upon logical units or items from a source files consisting of items of known length, they are controlled and linked by items of control information relating especially to the number and to the length of these items and drawn up in special registers.

The countings to be carried out for the processing of items of information belonging to one article are controlled first by items of control information contained in the codes of the divisions 1910 and 1914 of the control memory 11 and second, as far as the number of processings to be carried out for one line of this control memory is concerned, by the information contained in the division 01100 of the push-down store 0110 of the localization device 14 (FIG. 11) or any other memory and especially the auxiliary memory 51 taken as a push-down memory of the device 14.

This same line of the table 0110 of the localization device 14 includes divisions 01101 and 01102 in which are recorded the restart values respectively, of the counter 22 of the table of reference data elements 21 and of the counter 12 of the control memory 11 for the control of the linkages to be carried out at the end of the looping controlled by the information contained in this division 01100 or upon identification of the separator of the second level.

The end of the article corresponds in the store 0110 to the address or position stored of the line, the division 01102 of which controls the jump for the most enveloping loop.

The items of information which are to be drawn up in the divisions 01100, 01101 and 01102 are drawn up in sequence, line by line, in the push-down store 0110 according to the order in which the items of information corresponding with the processes to be carried out appear during the course of evolution of the files.

Above has been described the whole of the codes which may be recorded in one line of the control memory 11 corresponding with one horizontal zone of the array. Of course only the codes suitable for the execution of the processing desired are recorded.

The addresses corresponding with the auxiliary memory 51 are loaded into an associative device which enables the association one by one of the said address values of the auxiliary memory with the significant values provided by the counter of the control table at a given instant.

Whatever the embodiment chosen of the device in accordance with the invention, all of the instructions contained in one line of the control memory are read simultaneously by the microcontrol circuit 10 in order to be transformed into control signals.

Before describing the microcontrol circuit 10 with reference to the FIGS. 3 to 11 there will now be described diagrammatically the variant of the computing unit for comparison which is chosen, always by way of example, in this device in order to put into effect a method of the type of that described in the French Pat. No. 2293.741 and its Certificate of Addition No. 2330.075 (U.S. Pat. No. 4,053,871).

Computing Unit for Comparison

As shown in FIG. 2, each of the computing units for comparison 310, 311, 312, 313 is composed primarily of three elements 301, 302, 304 for combining together the elementary results corresponding with the comparison of a data element.

The element 301 compares the item of information received from the source files through the connection 1104 with the corresponding reference item received from reference table 21 through the connection 2100. The results of each comparison are stored, as each item of information is received, in the flip-flops 3010, 3011, 3012. The comparator 301 is initialized at the start of the receipt of the input data element by a connection 010 and it is actuated (like the flip-flops 3010, 3011 and 3012) by the clock signal 01 generated for each item of information received. When all the items of information of the input data element has been received and compared in comparator 3011 the contents of the flip-flops 3010, 3011, and 3012 represent the accumulated result of the successive matchings of the items of information.

A comparator 302 carries out, at the end of the input data element received, the matching of the result obtained with the reference code loaded into the division 11241 of the control memory 11 for a code 11240 giving to the operation a logical meaning. The items of information corresponding with the code contained in 11241 are transmitted to the comparator 302 by the connections 12500 after decoding in 11250 of the contents of 11240. A gate 11251 has its inputs connected to the connections 12500 in order to transmit over a connection 12501 an item of information which corresponds after decoding of the contents of 11240, with a zero code of operation (NOP) in 11241.

A flip-flop 304 initialized by the connection 010 enables storage according to an AND function of the results provided by the comparator 302 and transmitted through an OR gate 3013. The latter also has one input connected to the connection 12501. A connection 12200 transmits to the flip-flop 304 the item of information corresponding with one end of a input data element (see the next paragraph) in order to control the transfer of the result through the connection 3300.

Hence there is available on the connection 3300 the result of the comparison carried out upon each input data element received in the case of an operation-not-zero code, or a virtual result in the case of a zero-operation code.

CONTROL OF OPERATIONS OF THE FIRST LEVEL

In FIG. 3 is shown diagrammatically for the first level of the device, the control device relating to the declaration of the separator and of the data, to the exclusion of the codes 1124, the functions of the subassemblies 11240 and 11241 of which are explained above. The separator declared at 1100 corresponds with the first level of the device. It is identified by the comparator 11100 which receives from the source files each item of information (octet) through the connection 1104. The connection 01 which transmits the clock signal corresponding with the item of information received from the source files actuates the counter 11230, the result from which is matched by the comparator 11231, with the length value displayed in the division 1123. The items of information contained in the division 1122 (variable or fixed format) are decoded in 11220, especially in order to activate respectively, through the connections 11221 and 11222, either the comparator 11100 (variable format) or the comparator 11231 (fixed format). An OR gate 11232 receives a signal from the comparator 11100 after each identification of a first level separator (variable format) and receives a signal from the comparator 11231 after counting of the number of items of information recorded in 1123 (fixed format).

Hence the connection 12200 as the output from the OR gate 11232 controls the execution of the operations which are to be carried out at the end of a input data element of fixed length or upon identification of the separator.

The items of information contained in 1121 are if necessary decoded for processes which are to be carried out by the stage of the auxiliary store memory 51.

CONTROL OF THE SECOND LEVEL OPERATIONS

Figure 11:
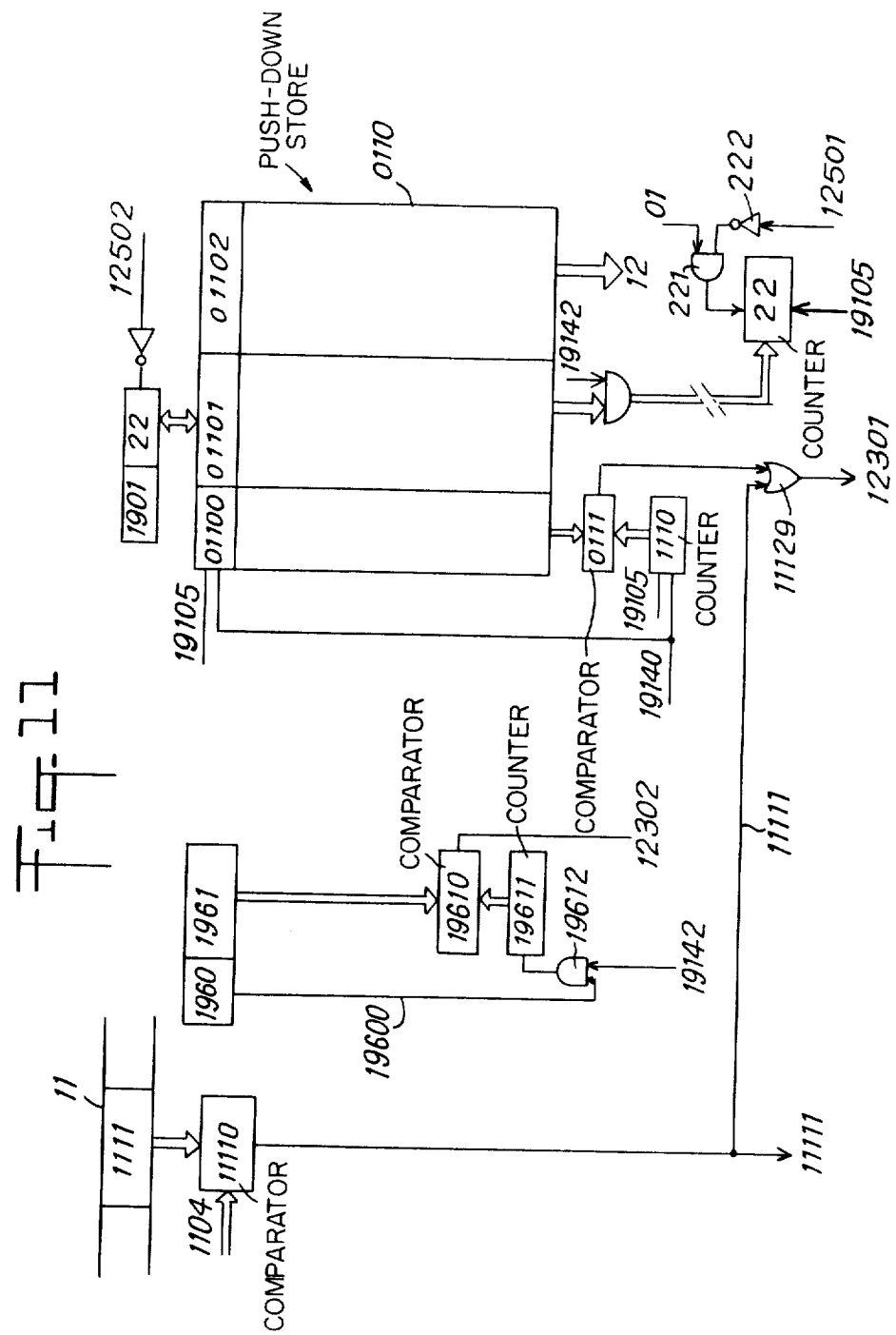
FIG. 11 is a more detailed diagram of the counting device from the device 14 illustrated in FIG. 1.

The device employed is the device 14 for localization of the items of information by counting or by identification of separators, which is represented diagrammatically in FIG. 11.

Into the registers 1960 and 1961 are loaded the items of information relating, respectively, to the control of the counting of the items belonging to one and the same file and to the number of these items.

In the push-down store 0110 of FIFO (FIRST IN, FIRST OUT) type are stored line by line in divisions 01100, 01101 and 01102 the items of information relating respectively to the localization by counting of the loops which are to be carried out, to the corresponding restart value of the counter 22 of the table of reference input data element 21, and to the corresponding restart value of the counter 12 of the control table 11. The items of information contained in sequence in the column containing the divisions 01100 of the push-down store 0110 provide the localization values by counting of the input data elements or of the separators of a file expressed in processing units corresponding each with one line of the control memory 11. For example, if it is required to control twice four loops in a first processing followed by two loops in a second processing, the column corresponding for the push-down store 0110 with the divisions 01100 will be loaded as below:

4
2
4
2.

For a processing corresponding with one line of the control memory 11, the contents of the division 01100 is matched by the comparator 0111 with the value from the counter 1110 actuated by the connection 19105 in FIG. 5 (see later the paragraph headed "Linkages onto the control table") which controls the operations to be carried out at the end of an input data element of fixed length or upon identification of the first level separator. When the number of processings recorded in the division 01100 is reached, the comparator 0111 provides a TRUE result and controls the operations to be carried out for the second level of the device, over a connection 12301 by way of an OR gate 11129. This connection 12301 is likewise activated through the gate 11129 by the TRUE result from the output 11111 from the comparator 11110 corresponding with the matching carried out upon the second level separator with the item of information received from the source files through the connection 1104. The connection 12301 enables the item of control information to be activated, which corresponds with the linkages to be carried out onto the control table 11 and transmitted through the connection 19140 as FIG. 5 (see the next paragraph) corresponding with the divisions 1914 and 1915 of this control memory 11 for the second level of the device. Through the connection 19140 are controlled the resetting to zero of the counter 1110, the restart of the processes to be carried out according to the restart values of the counters 22 and 12 contained in the divisions 01101 and 01102 of the same line of the push-down store 0110, and the incrementation of this push-down store 0110 store. This push-down store is then activated by the connection 19105 as FIG. 5 for the codes contained in the divisions 1910 and 1911 and corresponding with a loop instruction for the first level of the device. In default the absence of a loop instruction corresponding with the second level of the device the connection 12301 controls an incrementation of the table of reference data elements 21 and of the control table memory 11.

The items of information contained in the divisions 01101 are recorded in succession, zone by zone, at the time of the loading of the table 21 prior to the execution of the method of comparison. The recording in the divisions 01101 of the restart values of the counter 22 is carried out by means of the device 1901. By matching, the latter enables storing in the division 01101 corresponding with one line of the push-down store 0110, only the initialization value of the counter 22 corresponding for the reference data elements of this zone with the longest of the reference data elements belonging to the immediately prceding zone. In other words, for the first line of a zone of the reference table 21 the value of the counter 22 is that which follows the value of the counter for the last item of information of the longest reference data element of the preceding zone of the reference table 21. For certain operations, especially as is the case with operations of separation and merging, this initialization value may be fixed arbitrarily for a corresponding maximum length of the logical entities of the preceding zone.

When there is no data element to be compared for a processing which is to be carried out corresponding with one line of the control memory 11, that is to say, when the code of operation of the division 11241 after decoding of 11240 gives for this line a value equal to zero (NOP), the connection 12501 as in FIG. 2 blocks the counter 22 of the reference table 21 for its value corresponding with the initialization of this zone. This value of the counter 22 is recorded, if necessary, in the division 01101 of the stack store 0110 corresponding with this line of the control memory 11.

The items of information contained in the divisions 01102 and corresponding with the restart values in the control memory 11 are recorded in succession at the time of the loading of this memory 11.

At the end of each item, through a connection 19142 (see FIG. 5), the incrementation of a counter 19611 is controlled through an AND gate 19612 validated through the connection 19600 transmitting the item of information contained in the division 1960 (control of counting of items). The value from the counter 19611 is matched by a comparator 19610 with the contents of the division 1961 (number of items). The output 12302 from the comparator 19610 controls for a TRUE result a jump to the consecutive line of the control memory 11 corresponding with the operations to be carried out at the end of processing (terminal operations).

TRANSFER OF ITEMS OF INFORMATION

FIG. 4 illustrates diagrammatically the device for control relating to the transfer of the items of information. The code contained in 1130 after decoding by the decoder 1133, and the code contained in 1131 activate, through the connections 11300, and 11310 the decoding in 11321, 11322, . . . of the items of information contained in the divisions 1132 for controlling the transfer of the items of information received from the source files through the connection 1104 towards the push-down stores 61, 71, 81, 91 . . . of the corresponding peripheral units. The connections 11300 and 11310 are joined by an AND gate 1138 the output from which is therefore activated when a transfer has to be made.

The information transmitted through a connection 11301 after decoding in 1133 with the connection 11223 corresponding with the code contained in the division 1122 as FIG. 3 and relating to the format of the data declared, activates if there is declaration of data, the result transmitted through the connection 400 as FIG. 9 and the results transmitted through the connections P10, P11, P12, P13, P14, P15, P16, P17, . . . see FIG. 10. Hence the results are validated only if they concern data.

In the event of absence of information in the division 1122, that is to say, in the absence of declared data, the code 1130 after decoding in 1133 activates through the connection 1134 an AND gate 1135 in order to let pass towards a NOT OR gate 1136 the connection 11101 as FIG. 3 relating to the result of the matching carried out for the first level separator by the comparator 11100.

The connection 11302 which is still relative to the second level separator of the device, activates an AND gate 1137 in order to let pass towards the NOT OR gate 1136 the result of the matching carried out for the second level separator by the comparator 11110 as FIG. 11 and transmitted through the connection 11111 as the same Figure.

An AND gate 1139 receives the items of output information from the gates 1138 and 1136 in order to transmit the resulting item of information over a connection 11000 corresponding with the transfer of the separators. Hence this resultant item of information transmitted through the connection 11000 decrements in the absence of separators for a code 1130 or 1131 which is not zero, the push-down stores 61, 71, 81, 91, . . . of the corresponding peripheral units.

LINKAGES ONTO THE CONTROL TABLE

FIG. 5 illustrates diagrammatically the device for control relating to the linkages to be carried out onto the control memory 11 as, well as if necessary, onto the reference logical entities 21 table. The codes corresponding with the first level of the device are recorded in the divisions 1910 and 1911 and those corresponding with the second level in 1914 and 1915.

The items of information contained in the divisions 1910 and 1911 are decoded in 19100 with the item of information transmitted by the connection 12200 relating to the control of the operations which are to be carried out at the end of the comparisons for the first level of the device (FIG. 3) and with the item of information transmitted by the connection 400 and relating to the TRUE or FALSE result of the preceding comparisons (FIG. 9). The items of information contained in 1914 and 1915 are decoded in 19101 with the item of information transmitted by the same connection 400 as FIG. 9 and with the item of information transmitted by the connection 12301 and relating to the control of the operations to be executed at the end of comparison for the second level of the device (FIG. 11).

The control signals corresponding with the loop instructions recorded in the divisions 1910 and 1914 are transmitted by connections 19105 and 19140 as the output from the decoders 19100 and 19101. The control signals corresponding with the loop instructions recorded in the division 1914 control through the connection 19142, for an end of item, besides the operations controlled by the connection 19140, the operations corresponding with this end of item.

In default of any corresponding code in the divisions 1910 and 1914 the connections 19106 and 19141 control, conditionally or not, depending upon the codes contained in the divisions 1911 and 1915, an incrementation of the counter 12 of the control memory 11 (an implicit jump in the control memory).

LINKAGES ONTO THE REFERENCE TABLE

During the course of operations of comparison corresponding with one line of the control memory 11 the counter 22 is incremented for the successive items of information received from the input data elements which are to be compared and is brought back to its initialization value (the first line of the horizontal zone of the reference table 21 corresponding with this line of the control memory 11) after each processing (looping to the first level by initialization of the counter 22 through the connection 19105).

As shown in FIG. 11, the counter 22 is connected to the divisions 01101 through and AND gate device 0112 which is controlled by the connection 19142 so as to authorise the transfer of a restart value contained in a division 01101 when the division 1914 contains an item of control information for looping at the second level of the device. In the absence of this item of control information there is no transfer of a new value of initialization of the counter 22.

The counter 22 is in addition incremented by the connection 01 at each end of an item of information received from the file, through an AND gate 221, the other input to which is connected to the connection 12501 (FIG. 2) through an inverter 222. Hence there is incrementation of the counter 22 (passing from one line to the next of the reference table) only when the operation code is not zero on the connection 12501 (absence of NOP).

At the end of an operation of comparison carried out upon reference entities from one horizontal zone of the reference table 21, one passes to the first line of the next horizontal zone at the same time as one passes onto another line of the control memory 11. If there is no operation code in the division 11241 of this other line, any new incrementation of the counter 22 is blocked.

LINKAGES ONTO A PERIPHERAL UNIT

In FIG. 6 is shown diagrammatically the device for control relating to the linkages to be carried out onto the peripheral unit being read. The items of information contained in the divisions 1920 and 1921 (interruption of the reading of the peripheral unit, conditional or not) are decoded in 19200 with the item of information transmitted through the connection 400 and relating to the results of the comparisons (FIG. 9) and the item of information transmitted through the connections 12300 as in FIG. 11 and relating to the end of item. The information transmitted through the connection 1925 as the output from the decoder 19200 controls firstly over the corresponding peripheral controller the storage of the address and of the track position and the interruption of the reading of the peripheral unit and secondly sends a state signal about the device from the auxiliary memory 51.

OPERATIONS UPON REFERENCE RESULTS

The FIGS. 8 to 10 give diagrammatically the principles of the whole of the device for control relating to the reference results.

The divisions 1950 include each two sub-assemblies, that is, a sub-assembly 19501 where the binary value 1 or 0 is recorded, which corresponds with the reference result at the rate of one result per computing unit, and a sub-assembly 19502 where the binary element relating to the mask is recorded, the value 0 being chosen for reasons of convenience as representative of the mask. FIG. 8 gives the conventional diagram of a matching device associated with a masking device. The matching device includes an EXCLUSIVE OR gate 3301 which receives firstly the item of information from a sub-assembly 19501 through a connection 3310 and secondly the connection 3300 which transmits the result of the comparison carried out, as shown in FIG. 2. A connection 3311 transmits to an inverter 3302 the item of information from the sub-assembly 19502. The outputs from the gate 3301 and from the inverter 3302 are joined by an OR gate 3303 the output from which is connected to a connection 3340 in order to transmit to the computing unit for horizontal combination 3500 (FIG. 9) the TRUE or FALSE result obtained in accordance with the matching and the masking described above.

The FIG. 9 gives the principles of the horizontal modular Boolean computing unit 3500 formed of identical modules 3511, 3512, 3513, 3514.

The divisions 1951 include two sub-assemblies, that is, a subassembly 19511 where there is recorded the nature of the computing unit for combination + or ×, that is, in this example, 0 for × and 1 for ×, and an assembly 19512 in which is recorded the binary element relating to the mask of the computing unit, the value 0 being chosen for reasons of convenience as the mask of the computing unit.

The connections 3340, 3341, 3342, 3343, ... transmit as is shown in FIG. 8 the TRUE or FALSE Boolean results of the comparisons obtained by the computing units for comparison 310, 311, 312, 313, .... The connections 3360, 3361, 3362, 3363, ... and 3330, 3331, 3332, 3333, ... transmit the items of information contained in the corresponding divisions 19511 and 19512.

Each module 3510, 3511, 3512, 3513, ... may be considered as being arranged between two consecutive connections 3340, 3341, 3342, 3343, ... in order to validate the results transmitted over these connections according to the codes recorded in the divisions 1951. The construction of a module is as follows.

An AND gate 35101 receives over one input the code relating to the masking recorded in 19512 and over its other input the operator code recorded in 19511 and inverted by an inverter 35102. The output from the gate 35101 (the converse of the operator code in the absence of masking) controls an AND gate 35103 which receives the output from an OR gate 35104. The latter receives the outputs from two AND gates 35105 and 35106 which transmit the result of comparison (connection 3340 or 3341 or 3342 or 3343 ...) under the control respectively of the converse of the code relating to masking corresponding with the module located at the left (code inverted by an inverter 35107) and of the output from an OR gate 35108 the inputs to which are connected to the division 19511 (operator code) and to the output from the gate 35103. The output from the OR gate 35104 is likewise connected to one input to an AND gate 35109 which receives over its other input the operator code. The result on the connection 3340, 3341, 3342 3343, ... is validated or not as the output from the module over a connection (respectively 3501, 3502, 3503, 3504, ...) connected to the output from an OR gate 35110. The latter has one input connected to the output from the AND gate 35109 and the other input connected to the output from an AND gate 35111 which receives the code relating to the masking over a first control input and the output from the module located immediately to the right over its second input.

The second input to the module located furthest to the right is permanently at the low logical level (0), whereas its input connection 3334 is at the high logical level. The level of the input 3364 is not critical. The control inputs to the AND gates 35105 and 35106 of the module located furthest to the left are at the high level (1).

The operation of the computing unit 3500 is as follows.

An operator code equal to 1, corresponding consequently to an OR and recorded in 19511 has the result of validating through the gate 35108 the item of information providing a TRUE or FALSE result through the output connection from the computing unit for comparison (connection 3340, 3341, 3342, 3343, ...) which corresponds with it in accordance with the usual syntax, that is to say, the connection received immediately to the right, and hence of validating the next result independently of the preceding result. The same operator code equal to 1 has the result of validating the TRUE or FALSE result corresponding with the connection 3340, 3341, 3342, or 3343 located immediately to its left, that is to say, of validating it through the gates 35109, 35110, through the corresponding connection 3501, 3502, 3503, or 3504 independently of the result on the right.

An operator code equal to 0, that is to say, corresponding with an AND will on the contrary have for an item of information relating to the mask and equal to 1, that is to say, in the absence of masking, the effect of subjecting the validity of an elementary TRUE result which follows it, to a TRUE result located immediately to its left (through the gate 35103) and of not validating the TRUE result which may correspond with the connection 3340, 3341, 3342 or 3343 located immediately to its left.

A code relating to the masking and equal to 0, that is to say, signifying that there is masking of the Boolean operator code will have the effect of behaving as far as the horizontal combinations are concerned as if it were an operator code equal to 1, that is to say, corresponding with an OR. Thus a code signifying that there is masking of the computing unit validates the next result independently of the preceding result through the inverter 35107 and validates the result located immediately to its left independently of the result from the right (gate 35111 closed). The same code equal to 0 will moreover have the effect of prohibiting an OR combination for the results obtained in 3501, 3502, 3503 and 3504 between two results located semantically on opposite sides of this said code equal to 0.

An OR carried out between the results 3501, 3502, 3503, 3504, ... by the gate 3515, through the connection 400 as outlet from this gate, enables the operations to be controlled, which are to be executed conditionally and corresponding with the connections 12300 (end of item), 12301 (linkage onto the control table) as FIG. 11.

The device described in FIG. 9 may be completed by the priority device as FIG. 10 which enables there to be apportioned onto one of a number of peripheral units the items of information which are to be preserved according to the bracketings obtained for computing units carrying out a comparison according to a code of inequality.

In the example illustrated the results obtained in 000, 001, 002, 003, 004, 005, 006, 007, ... are validated in P10, P11, P12, P13, P14, P15, P16, P17, ... for the TRUE result furthest to the left only, for example, for one operator code. The connection 020 is set to 1.

The priority device is in the example illustrated formed of identical modules P00 consisting of an AND gate P01, one first input to which receives the output from the preceding module (or the connection 020 for the module furthest to the left) and the other input to which receives the output from an inverter P02 which inverts the output from an AND gate P02, one input to which is connected to the input to the gate P01 and the other input to which receives the result to be validated or not over the output from this gate P02. Thus as long as the results to be validated are zeros, from left to right, a level 1 is present at the outputs from the modules P00 and a level 0 is present at the validation outputs.

As soon as one result is at the level 1, the corresponding validation output is at 1 and a level 0 is established over the outputs from the modules located to the right, which forces the level 0 over the validation outputs of these modules whatever the value of the result to be validated.

Hence the device illustrated by the FIG. 10 clearly awards the priority to the first TRUE result appearing from the left of the Figure.

CONTROL RELATING TO THE TESTS

FIG. 7 gives diagrammatically the principle of the device for control relating to the tests carried out for the preservation of the stored items. An item of information contained in the division 1930 activates through the connections 19301, 19302, 19303, 19304, . . . after decoding in 19300, the devices for restart of the various counters of the push-down stores 61, 71, 81, 91, . . . for which have been transmitted the items of information to be stored according to the codes contained in the divisions 1132. The decoding device 19300 receives the connections 12302 as FIG. 11 and is activated by the connections P10, P11, P12, P13, P14, P15, P16, P17 as FIG. 10.

The item of information contained in the code from the division 1931 (instruction for counting of the TRUE results) is activated for a TRUE result by the connection 400 as FIG. 9 in order to control the counter 19310 which counts the TRUE results.

EXAMPLES

EXAMPLE 1

Required, to find the names of persons born at Montpellier between 1940 and 1970 in a source files the construction of which is as follows:

|   | ARX | ARX34 U |   |   |   | / |
|---|---|---|---|---|---|---|
|   | NAME |   | PLACE | DATE |   |   |

| / | / | / |   |   | U |   | U |   | U |
|---|---|---|---|---|---|---|---|---|---|

| / |   | * |   |
|---|---|---|---| the control memory 11 of the processor having parallel units is to be loaded as follows:

|   | D | S | M | A | I | P | T | R |
|---|---|---|---|---|---|---|---|---|
| 0 | :AF04 | : | : | : | : | : | : | : |
| 1 | :AF03 | : | :I | :P | : | : | : | : |
| 2 | :AV = | :U* | : | I | :P | : M | :RI | :1 |
| 3 | : | :/ | : | : | :B | : | : | : |
| 4 | :AF05 | : | :C | :P | : | : | : | : |
| 5 | :AV = | :U | : | : | : | : | : | :1 |

| | D | S | M | A | I | P | T | R |
|---|---|---|---|---|---|---|---|---|
| 6 | :AF04≦≧ | : | : | : | : | : | : | :1 × 1 |
| 7 | : | :/ | :C | :P | :A | : | :T | : | and the reference table 21 takes the following form;

| 0 | A |   |
|---|---|---|
| 1 | R |   |
| 2 | X |   |
| 3 | A |   |
| 4 | R |   |
| 5 | X |   |
| 6 | 3 |   |
| 7 | 4 |   |
| 8 | U |   |
| 9 | M |   |
| 10 | O |   |
| 11 | N |   |
| 12 | T |   |
| 13 | P |   |
| 14 | E |   |
| 15 | L |   |
| 16 | L |   |
| 17 | I |   |
| 18 | E |   |
| 19 | R |   |
| 20 | U |   |
| 21 | 1 | 1 |
| 22 | 9 | 9 |
| 23 | 4 | 7 |
| 24 | 0 | 0 |

In the control memory 11, the successive columns are D for data and operative codes, S for separators, M for transfers, A for the designation of the corresponding storage devices, I for the instructions on the control memory, P for the instructions corresponding with the linkages onto peripherals being read, T for the instructions corresponding with the tests and R for the instructions corresponding with the reference results.

In the column of the data AF designates the item of information of fixed format, AF03, AF04, AF05 an item of information of fixed formation of 3, 4, 5 octets, AV an item of information of variable format.

In the column M, I signifies unconditional transfer and C conditional transfer.

In the column A, P signifies the peripheral unit being read.

In the column I, M signifies jumping to the auxiliary memory, B signifies a loop and A signifies a loop corresponding with the end of the item.

In the column P, RI signifies unconditional interruption for restart at the same address on the track.

In the column T, T signifies logical test for the preservation of the results.

EXAMPLE 2

Required, to carry out upon files constructed of fixed length four loops inside two loops, assuming if need be that the loopings to be carried out are given by the system.

Required, as described below, the corresponding bibliographical file:

| 3 | 12 | 6 | 3 | 4 | 4 | 4 | 4 |
|---|----|---|---|---|---|---|---|
| F712 | (LIBR No) | (HEADING) | B | 4 | (CONTENTS ANALYSIS CODES) | | |

| 6 | 3 | 4 | 4 | 4 | 4 | 4 |
|---|---|---|---|---|---|---|
| (HEADING) | B | 5 | (CONTENTS ANALYSIS CODES) | | | |

(the figures located above the portions of the file indicate the length of the fixed format of the items of information contained in these portions).

And required, to search according to three codes for analysis referring to two headings, for the library number of a work, one will have in the control memory 11 the instructions drawn up as blow (the letters have the same meaning as in Example 1, the letter L in the column A signifying a return towards the counting table 0110)

|   | D | S | M | A | I | P | T | R |
|---|---|---|---|---|---|---|---|---|
| 0 | AF03 |  | I | L |  |  |  |  |
| 1 | Af12 |  | C | P |  |  |  |  |
| 2 | Af06= | = |  |  |  |  | 1 | 1 |
| 3 | AF03 |  | I | L |  |  |  |  |
| 4 | AF04= | = |  |  |  | BA | T | 1 × 1 × 1 |

The reference table 21 will appear in the following manner, where the loading may be carried out by the system:

|   |   | 1 | • 327281 is a heading |
|---|---|---|---|
| 2 |   | 8 | code (6 figures), |
| 7 |   | 9 | similarly 189520. |
| 2 |   | 5 |   |
| 8 |   | 2 |   |
| 1 |   | 0 | • 2432,8638 and 4447 |
| 2 | 1 | 4 | are codes for analysis of the contents |
| 4 | 6 | 4 | (4 figures). |
| 3 | 3 | 4 |   |
| 2 |   | 7 |   |

EXAMPLE 3

Required, to carry out a certain random number of loops for a files constructed partially of length variable by labels or separators.

Required, as described below the corresponding bibliographical file:

|   | D | S | M | A | I | P | T | R |
|---|---|---|---|---|---|---|---|---|
| 0 |  | / |  |  |  |  |  |  |
| 1 | AV |  | U§ |  |  | L M | RI |  |
| 2 | AF08 |  |  | C | P |  |  |  |
| 3 | AV = = |  | U/ |  |  | L B |  | 1 | 1 |
| 4 | AV = = = |  | U* |  |  | B A | T | 1 × 1 × 1 |

The reference table will be loaded as follows:

| W |   |   |
|---|---|---|
| O |   |   |
| R |   |   |
| K |   |   |
| U |   |   |
| A | S |   |
| N | O |   |
| A | U |   |
| L | R |   |
| Y | U |   |
| S |   |   |
| U |   |   |
| C | G | P |
| I | A | R |
| C | L | I |
| E | B | V |
| R | A | A |
| O | U | T |
| U |   | E |
|   |   | U |

It may be observed that the device can allow greater flexibility in the construction of the file and consequently of the writing of the instructions if as assumed in particular in this example the end-of-item separator is stored separately in order to compare it with each of the items of information received during the course of processing in accordance with the method of comparison described by the French Pat. No. 2 293 741 and its

|   |   | 8 |   |   |
|---|---|---|---|---|
| § / / | WORK U | (LIBR No) | ANALYS U | CICERON U PRO-MURENA U CATILINA |

| GALBA U | • | SOUR U | NAT-LIBR U ARSENAL U FLORENCE U VATICAN U PRIVATE U | • / § |

And required, to search for the library number of a work concerning CICERO and GALBA and employing sources drawn from PRIVATE COLLECTIONS the control store will be loaded as below: (in the column I the letter L signifies conditional jump to the consecutive processing)

Certificate of Addition No. 2 330.075 (U.S. Pat. No. 4,053,871).

Similarly the end of the article may be marked for a definite construction of fixed length by storage of the length of the item and in any case by the storage of the corresponding address in the localization table upon the execution of the restart of the most enveloping loop, that is to say, corresponding with the item.

In the examples the loading of the table of counting device is effected as far as the loops to be carried out inside an item are concerned, by way of the loading device 13, taking B as the code for selection of the looping operations. The instruction therefore comprises firstly the construction of the loopings to be carried out and secondly the restart value of the counter 22 of the control store for the first looping corresponding with the second level of the control device.

Thus for the three examples given above, the table of the counting device is loaded respectively as follows:

| : 4 : : | : 4 : 2 : | : 1 : 3 : |
|---|---|---|
| : 1 : 2 : | : 5 : 1 : | : 1 : 1 : |

The absence of the item of information of the restart value of the counter 22 of the control memory 11 signifies an incrementation of this store to be carried out at the end of looping.

When the end of the loopings is controlled by a separator the items of information corresponding with the construction of the loopings may be absent.

The loading of the divisions 01001 is effected implicitly as described above, by means of the device 1901 in FIG. 11.

What is claimed is:

1. A method for processing information received from a file which includes data elements of different types, each data element consisting of a fixed or variable number of items of information, each item of information in a given data element having a different respective order, data elements of a first type being arranged in sequences which are identified by a data element of a second type, said method comprising the steps of:

(A) storing reference data elements in a table logically divided into horizontal zones and vertical columns, each horizontal zone storing one or more reference data elements which are of a same said type and which are to be simultaneously compared to a data element received from the file such that eah said horizontal zone is associated with reference data elements of a respective type, each reference data element consisting of a fixed or variable number of items of information, each item of information in a given reference data element having a different respective order, each reference data element being stored vertically in a respective vertical column of the horizontal zone in which it is located with each item of information of that reference data element being located in a respective line of that vertical column, and the vertical order of said horizontal zones following the order in which the data elements of types corresponding to said zones appear in said file;

(B) storing control information in a control memory which is logically divided into a plurality of lines, each line of said memory containing:

(1) first items of control information including: comparison control information identifying the type of comparison to be made between data elements of a same type received from said file and reference data elements of this type stored in a horizontal zone of said table, which zone corresponds to the line of the memory wherein said comparison control information is stored; and storage control information relating to the storage of the data elements received from said file; and (2) second items of control informaton indentifying operations to be carried out when a comparison operation is completed between one or more data elements received from the file and one or more corresponding reference data elements in said table, said second items of control information including jump control information identifying the next line in said control memory and/or the next horizontal zone in said table which is to be jumped to;

(C) sequentially receiving items of information from said file; and (D) executing the operations of comparison and/or storage identified by the first items of control information stored in a first line of said control memory, jumping to the next line of said control memory identified by the jump control information stored in said first line of said control memory and then executing the operations identified by the items of control information stored in said next line of said control memory, each operation of comparison being carried out by simultaneously comparing each item of information of a received data element with each item of information of the same order of each reference data element of the same type as the received data element, said step of executing operations of comparison and/or storage being carried out without interrupting the receipt of data elements from said file and without intermediate storage of the received data elements and each item of information received from the file initializing the execution of the operations controlled by the control information contained in said control memory and relating to this item of information.

2. A method as claimed in claim 1 and further comprising the step of recording in at least one line of the control memory special characters employed as marks in the file, said special characters also consisting of a number of items of information as the other data elements contained in the file.

3. A method as claimed in claim 1 and further comprising the steps of:

recording in at least one line of the control memory further items of control information relative to loops to be carried out for the operations corresponding to said at least one line of the control memory;

recording in memory means information representing the number of said loops to be carried out;

counting the number of times the operations identified by the first items of control information contained in said at least one line of the control memory are carried out during the processing of the information received from said file; and performing the operations corresponding to said jump control information contained in said at least one line of the control memory when said counted number is equal to said recorded number.

4. A method as claimed in claim 1, further comprising the step of recording in at least one line of the control memory information relating to the structure of the data elements whereupon operations identified by the first items of control information contained in said at least one line are to be carried out, said structure information being used to recognize the end of each one of said last mentioned data elements.

5. A device for processing information received from a file which includes data elements of different types, each data element consisting of a fixed or variable number of items of information, each item of information in a given data element having a different respective order, data elements of a first type being arranged in sequences which are identified by a data element of a second type, said device comprising:

(A) a table in which reference data elements are stored, said table being logically divided into horizontal zones and vertical columns, each horizontal zone storing one or more reference data elements which are of the same one of said types and which are to be simultaneously compared to a data element of that type received from the file such that each horizontal zone is associated with reference data elements of a respective type, each reference data element consisting of a fixed or variable number of items of information, each item of information is a given reference data element having a different respective order, each data element being stored vertically with each item of information of that reference data element being located in a respective line of that vertical column, and the vertical order of said horizontal zone following the order in which the data elements of types corresponding to said zones appear in said file;

(B) a control memory separate from said table and in which control information is stored, said control memory being logically divided into a plurality of lines, each line of said memory containing:

(1) first items of control information including: comparison control information identifying the type of comparison to be made between data elements of a same type received from said file and reference data elements of this type stored in a horizontal zone of said table, which zone corresponds to the line of the memory wherein said comparison control information is stored; and control storage information relating to the storage of the data elements received from said file; and (2) second items of control information identifying operations to be carried out when a comparison operation is completed between one or more data elements received from the file and one or more corresponding reference data elements in said table, said second items of control information including jump control information identifying the next line in said control memory and/or the next horizontal zone in said table which is to be jumped to;

(C) operating units each having a first input connected to receive the items of information of the file and a second input connected to receive the items of information stored in a respective column of said table; and (D) a control circuit connected to said control memory for delivering control signals corresponding to the items of control information stored in said memory so as to execute the operations of comoparison and/or storage identified by the first items of control information stored in a first line of said control memory, to jump to the next line of said control memory identified by the jump control information stored in said first line of said control memory and then to execute the operations identified by the items of control information stored in said next line of said control memory, each operation of comparison being carried out in said operating units by simultaneously comparing each item of information of a received data element with each item of information of the same order of each reference data element of the same type as the received data element, the operations of comparison and/or storage being carried out without interrupting the receipt of data elements from said file and without intermediate storage of the received data elements and each item of information issued from the file being applied to said control circuit for initializing the execution of the operations controlled by the control information contained in said control memory and relating to this item of information.

6. A device as claimed in claim 5, further comprising memory means for recording in at least one line thereof information relating to the number of loops to be carried out on data elements received from the file, in the execution of the operations identified by the first items of control information contained in one line of said control memory corresponding to said one line of the memory means, counting means for counting the number of times the operations identified by the first items of control information contained in said one line of the control memory are executed, and comparator means connected to said memory means and counting means for controlling the execution of the operations identified by the second items of control information contained in said one line of the control memory when the number counted in said counting means is equal to said information recorded in said memory means.

* * * * *